US010800210B2

(12) United States Patent
Nishiwaki

(10) Patent No.: US 10,800,210 B2
(45) Date of Patent: Oct. 13, 2020

(54) TIRE

(71) Applicant: Sumitomo Rubber Industries, Ltd., Kobe-shi, Hyogo (JP)

(72) Inventor: Takashi Nishiwaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 244 days.

(21) Appl. No.: 15/803,440

(22) Filed: Nov. 3, 2017

(65) Prior Publication Data
US 2018/0141385 A1 May 24, 2018

(30) Foreign Application Priority Data

Nov. 22, 2016 (JP) .................. 2016-227070
Aug. 25, 2017 (JP) .................. 2017-161819

(51) Int. Cl.
*B60C 11/03* (2006.01)
*B60C 11/13* (2006.01)
*B60C 11/12* (2006.01)

(52) U.S. Cl.
CPC ...... *B60C 11/0302* (2013.01); *B60C 11/0306* (2013.01); *B60C 11/1315* (2013.01); *B60C 11/0309* (2013.01); *B60C 11/12* (2013.01); *B60C 2011/0346* (2013.01); *B60C 2011/0353* (2013.01); *B60C 2011/0372* (2013.01); *B60C 2011/0374* (2013.01)

(58) Field of Classification Search
CPC .............................. B60C 2011/0346
See application file for complete search history.

(56) References Cited

U.S. PATENT DOCUMENTS

| 4,736,782 A * | 4/1988 | Kanamaru .......... B60C 11/0306 152/209.18 |
| 5,361,815 A * | 11/1994 | Loser .................. B60C 11/0306 152/209.19 |
| 2010/0224397 A1* | 9/2010 | Shimizu .............. H01L 23/5384 174/260 |

(Continued)

FOREIGN PATENT DOCUMENTS

| EP | 3199375 A1 | 8/2017 |
| JP | 61-175104 A | 8/1986 |

(Continued)

OTHER PUBLICATIONS

Extended European Search Report, dated Mar. 29, 2018, for European Application No. 17195404.3.

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

A tire includes a tread portion being provided with a crown main groove extending continuously in a zigzag manner in a tire circumferential direction and a shoulder main groove extending continuously in a zigzag manner in the tire circumferential direction. The shoulder main groove is arranged outwardly of the crown main groove in a tire axial direction. The crown main groove has a number of zigzag pitches in a range of from 0.21 to 0.32 times a number of zigzag pitches of the shoulder main groove.

17 Claims, 8 Drawing Sheets

(56) References Cited

U.S. PATENT DOCUMENTS

| | | | |
|---|---|---|---|
| 2014/0224397 A1* | 8/2014 | Okabe | B60C 11/033 152/209.23 |
| 2015/0352902 A1* | 12/2015 | Takei | B60C 11/0306 152/209.25 |
| 2016/0176235 A1* | 6/2016 | Takayama | B60C 11/0306 152/209.2 |
| 2016/0221397 A1* | 8/2016 | Maehara | B60C 11/0306 |

FOREIGN PATENT DOCUMENTS

| | | | |
|---|---|---|---|
| JP | 2010-18126 A | | 1/2010 |
| JP | 2010018126 A | * | 1/2010 |
| JP | 2015-157600 A | | 9/2015 |
| WO | WO 00/29228 A1 | | 5/2000 |

* cited by examiner

TIRE

BACKGROUND ART

Field of the Invention

The present invention relates to tires, and more particularly to a tire capable of improving noise performance and wet performance in a well balanced manner.

Description of the Related Art

Generally, tires include tread portions provided with circumferentially extending main grooves in order to drain the water existing on the ground backwardly in the tire rotational direction. On the other hand, the main grooves of the tires may generate an air column resonance noise during running on dry road since a standing wave of the air is generated in the main grooves. It has been known that the air column resonance noise is one of major cause of tire noise. Thus, in order to improve noise performance of tires, it has been proposed to lower volume of the main grooves.

Unfortunately, tires having small volume of main grooves tend to have poor wet performance due to reduction of drainage performance.

SUMMARY OF THE INVENTION

The present invention has been made in view of the above circumstances, and has a main object to provide tires capable of improving noise performance while maintaining wet performance by mainly modifying a shoulder main groove.

In one aspect of the invention, a tire includes a tread portion being provided with a crown main groove extending continuously in a zigzag manner in a tire circumferential direction and a shoulder main groove extending continuously in a zigzag manner in the tire circumferential direction. The shoulder main groove is arranged outwardly of the crown main groove in a tire axial direction. The crown main groove has a number of zigzag pitches in a range of from 0.21 to 0.32 times a number of zigzag pitches of the shoulder main groove.

In another aspect of the invention, the crown main groove may include a plurality of crown inclined elements each inclined at an angle with respect to the tire axial direction, the shoulder main groove may include a plurality of shoulder inclined elements each inclined at an angle with respect to the tire axial direction, and a maximum value of the angle of each the crown inclined elements may be smaller than a maximum value of the angle of each the shoulder inclined elements.

In another aspect of the invention, the maximum value of the angle of each of the crown inclined elements may be in a range of from 55 to 70 degrees with respect to the tire axial direction, and the maximum value of the angle of each of the shoulder inclined elements may be in a range of from 60 to 75 degrees with respect to the tire axial direction.

In another aspect of the invention, a minimum value of the angle with respect to the tire axial direction of each of the crown inclined elements may be greater than a minimum value of the angle with respect to the tire axial direction of each of the shoulder inclined elements.

In another aspect of the invention, the minimum value of the angle of each of the crown inclined elements may be in a range of from 50 to 65 degrees with respect to the tire axial direction, and the minimum value of the angle of each of the shoulder inclined elements may be in a range of from 35 to 60 degrees with respect to the tire axial direction.

In another aspect of the invention, each of the crown main groove and the shoulder main groove may have a pair of groove walls inclined at an angle of from 4 to 15 degrees with respect to a tread normal line.

In another aspect of the invention, the shoulder main groove may include an axially outer groove edge having a first inner peak portion located axially innermost thereof and an axially inner groove edge having a second outer peak portion located axially outermost thereof, and an axial length between the first inner peak portion and the second outer peak portion may be in a range of from 3% to 5% of a tread width TW.

In another aspect of the invention, a width of the shoulder main groove may be greater than a width of the crown main groove.

DESCRIPTION OF THE PREFERRED EMBODIMENTS

An embodiment of the present invention will be explained below with reference to the accompanying drawings.

Figure 1:
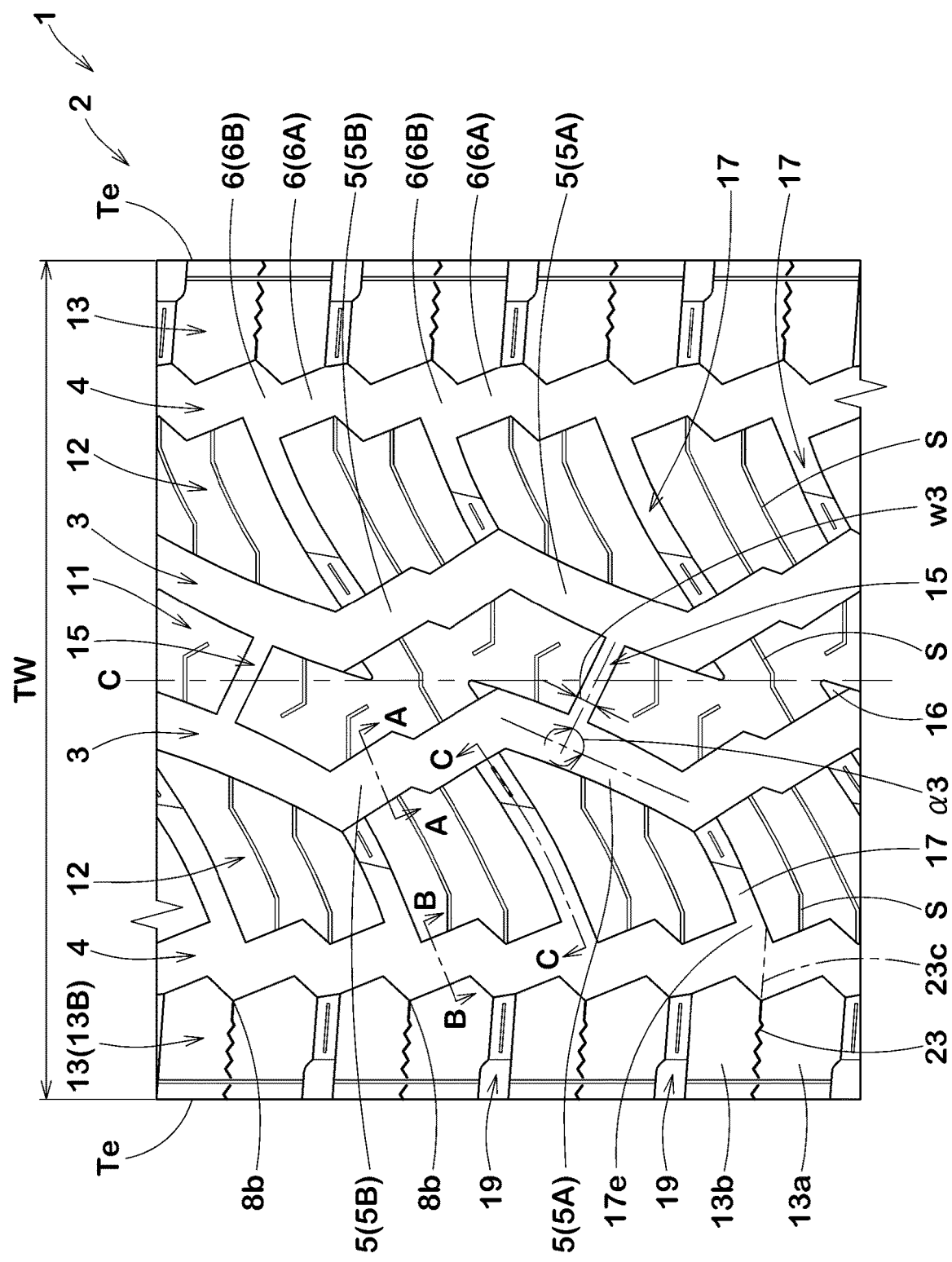
FIG. 1 is a development view of a tread portion according to one embodiment of the present invention.

FIG. 1 is a development view of a tread portion 2 of a tire 1 according to one embodiment of the present invention. The present invention may be embodied as a various kinds of tires, e.g., pneumatic tires for passenger car or heavy duty vehicle, and non-pneumatic tires which can support the tire load structurally without being filled with a pressurized air. The tire 1 in accordance with the present embodiment is suitably embodied as a passenger car tire.

As illustrated in FIG. 1, the tire 1 includes the tread portion 2 which is provided with a crown main groove 3 extending continuously in a zigzag manner in the tire circumferential direction and a shoulder main groove 4 extending continuously in a zigzag manner in the tire circumferential direction. The shoulder main groove 4 is arranged outwardly of the crown main groove 3 in the tire axial direction. The crown main groove 3 as well as the shoulder main groove 4 which extend in a zigzag manner may disturb generating a standing wave of the air flowing therein to suppress an air column resonance noise. Further, since the crown main groove 3 as well as the shoulder main groove 4 may exhibit drainage performance, wet performance of the tire can be ensured.

The crown main groove 3, in the embodiment, is arranged on both sides of the tire equator C. In some preferred embodiment, the pair of crown main grooves 3 may have the same zigzag phase from each other. The shoulder main groove 4, in the embodiment, is provided between the crown main groove 3 and a tread edge Te on each side of the tire equator C.

As used herein, the tread edges Te refer to axially outermost edges of the ground contacting patch of the tread portion 2 which occurs under a condition where the tire being under a standard condition is grounded on a plane with a standard tire load at the camber angle of zero.

As used herein, the standard condition is such that the tire is mounted on a standard wheel rim (not illustrated) with a standard pressure, but is loaded with no tire load. In this application including specification and claims, various dimensions, positions and the like of the tire refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of tires for passenger car, however, the standard pressure is defined uniformly as 180 kPa.

Further, in case of tires which are not based on any standards, e.g., racing tires, the standard rim and the standard pressure are respectively defined as the rim and the pressure which are recommended by the manufacturers.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like. In case of tires for passenger car, however, the standard tire load is defined uniformly as 88% load of the above-mentioned tire load.

Figure 2:
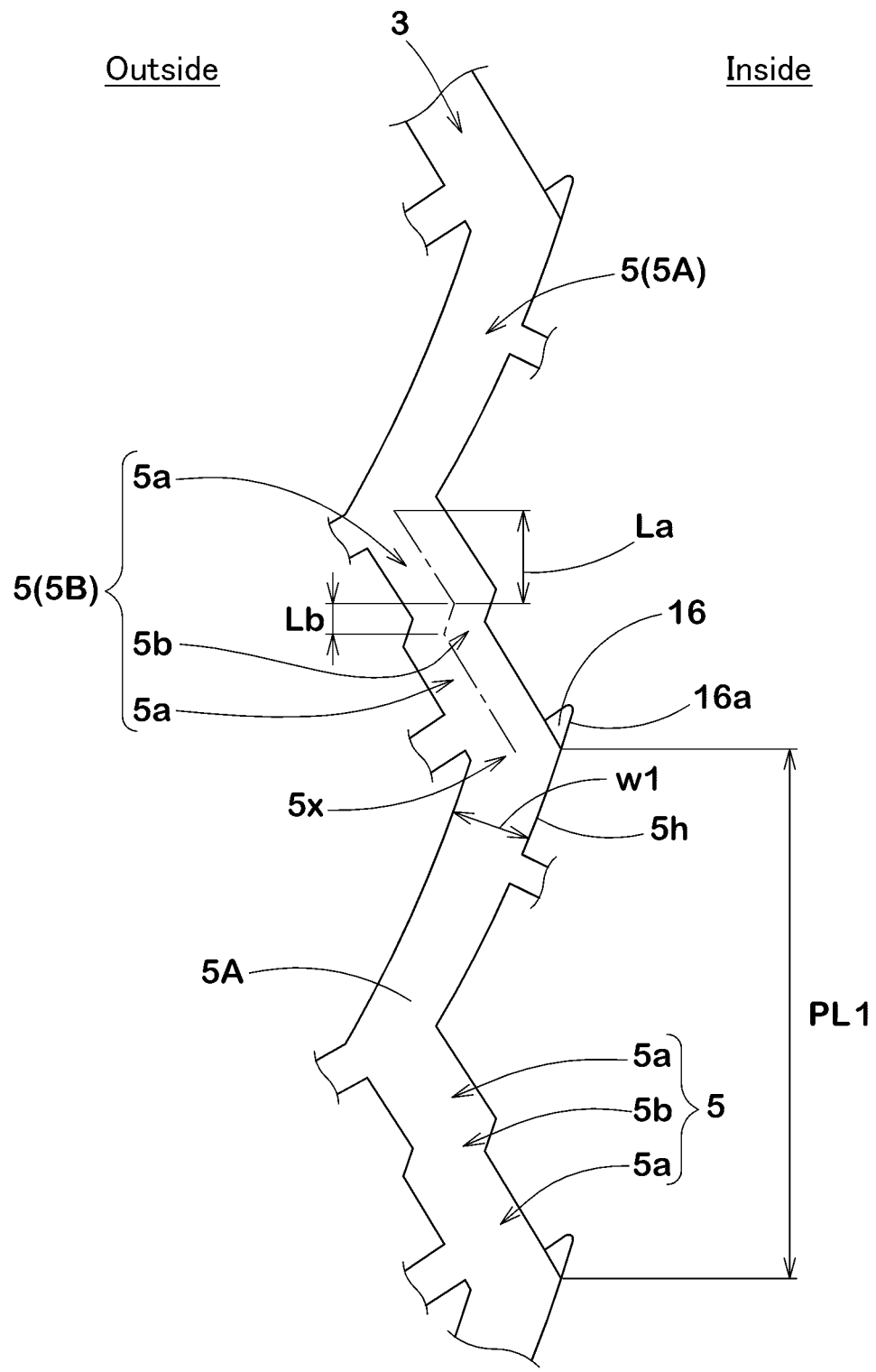
FIG. 2 is an enlarged view of a crown main groove of FIG. 1.
Figure 3:
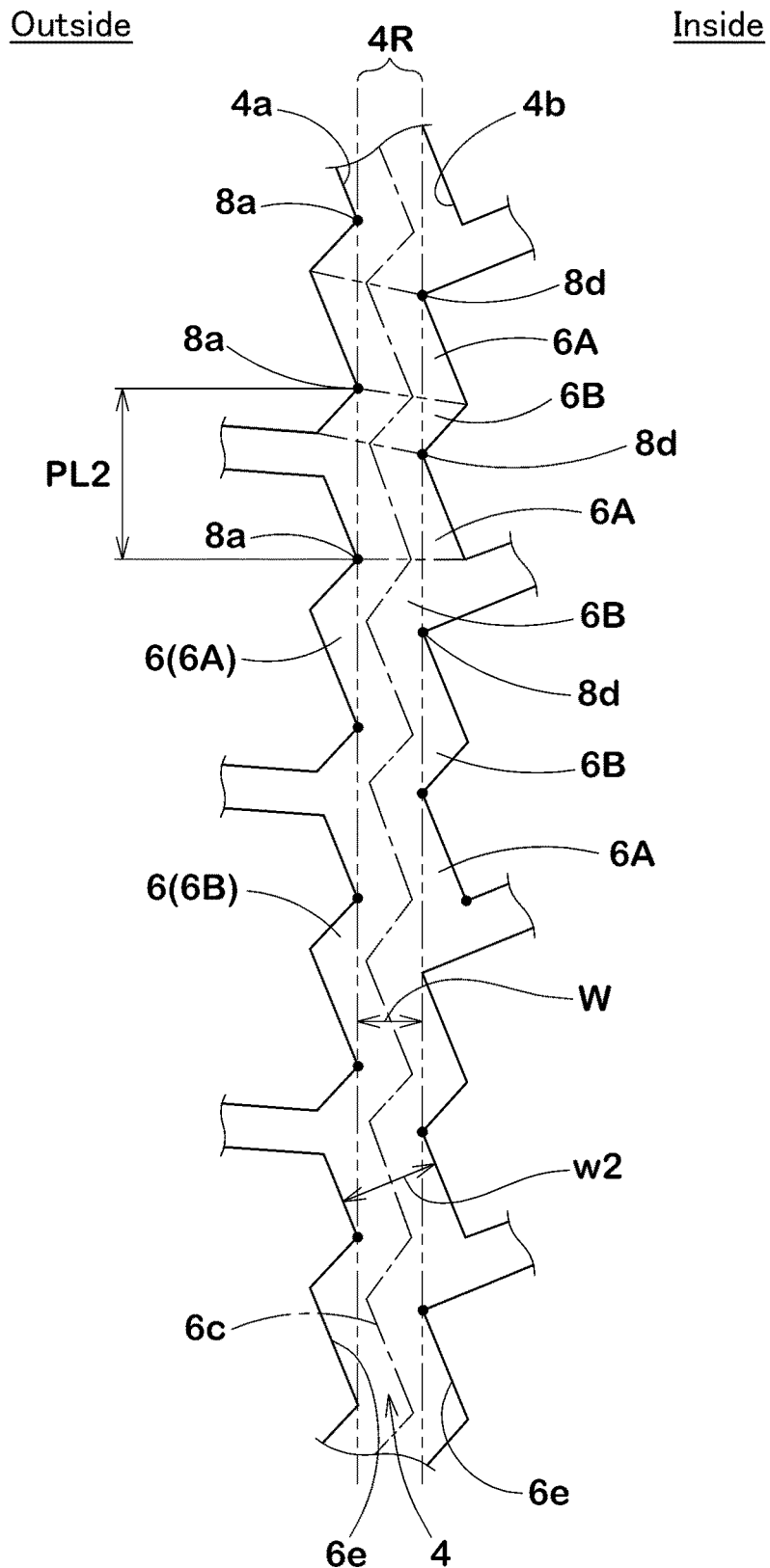
FIG. 3 is an enlarged view of a shoulder main groove of FIG. 1.

FIG. 2 illustrates an enlarged view of the crown main groove 3 which is located on the left side of the tread portion in FIG. 1, and FIG. 3 illustrates an enlarged view of the shoulder main groove 4 which is located on the left side of the tread portion in FIG. 1. As illustrated in FIGS. 2 and 3, the number P1 of the zigzag pitches PL1 of the crown main groove 3 is set in a range of from 0.21 to 0.32 times the number P2 of the zigzag pitches PL2 of the shoulder main groove 4. Thus, the crown main groove 3 and the shoulder main groove 4 generate different frequency of the air column resonance noise so as to improve noise performance of the tire by modulating the tire noise into a white noise. Furthermore, the water on the ground existing on the side of the tire equator C of the tread portion 2 is typically difficult to be discharged as compared with the water existing on the ground on the side of the tread edges Te of the tread portion 2. Since the number of the pitches of crown main groove 3, which is arranged on the side of the tire equator C, is less than the number of pitches of the shoulder main groove 4, the crown main groove 3 may drain the water smoothly. Thus, better wet performance of the tire can be maintained. In order to further improve the above advantageous effect, the number P1 of the zigzag pitches of the crown main groove 3 is preferably 0.25 times (one fourth) the number P2 of the zigzag pitches of the shoulder main groove 4. Note that the number of zigzag pitches of each main groove is specified using crown inclined elements 5 and shoulder inclined elements 6 which will be described later.

The crown main groove 3 includes a plurality of crown inclined elements 5 inclined with respect to the tire axial direction. The crown inclined elements 5 include a plurality of first crown inclined elements 5A each inclined in a first direction (the lower left side in FIG. 2) with respect to the tire axial direction and a plurality of second crown inclined elements 5B each inclined in a second direction which is an opposite direction (the lower right side in FIG. 2) to the first crown inclined elements 5 with respect to the tire axial direction. In the embodiment, each of the second crown inclined elements 5B further include a pair of inclined portions 5a each inclined in the second direction with respect to the tire axial direction and a small inclined portion 5b arranged between the pair of inclined portions 5a and 5a with a smaller circumferential length Lb than the length La of the inclined portions 5a and inclined in the first direction with respect to the tire axial direction.

The shoulder main groove 4 includes a plurality of shoulder inclined elements 6 inclined with respect to the tire axial direction. The shoulder inclined elements 6 include a plurality of first shoulder inclined elements 6A each inclined in the second direction (the lower right side in FIG. 2) with respect to the tire axial direction and a plurality of second shoulder inclined elements 6B each inclined in the first direction (the lower left side in FIG. 2) which is an opposite direction to the first shoulder inclined elements 6A. The second shoulder inclined elements 6B have smaller lengths in the tire circumferential direction than those of the first shoulder inclined elements 6A. Further, the second shoulder inclined elements 6B have smaller angles with respect to the tire axial direction than those of the first shoulder inclined elements 6A. The first shoulder inclined elements 6A and the second shoulder inclined elements 6B are arranged alternately in the tire circumferential direction.

In some preferred embodiment, a maximum value of an angle $\alpha 1$ (illustrated in FIG. 4) of each of the crown inclined elements 5 with respect to the tire axial direction may be set smaller than a maximum value of an angle $\alpha 2$ (illustrated in FIG. 5) of each of the shoulder inclined elements 6 with respect to the tire axial direction. Thus, reduction in wet performance may be suppressed since relative deterioration of drainage through the shoulder main groove 4, which may be caused by setting the number P1 of the zigzag pitches being in a range of from 0.21 to 0.32 times the number P2 of the zigzag pitches, is suppressed. Further, noise performance of the tire may be maintained since relative deterioration of effect to disturb generating pipe resonance noise in the crown main groove 3, which may be caused by setting the number P1 of the zigzag pitches being in a range of from 0.21 to 0.32 times the number P2 of the zigzag pitches, is suppressed.

When the maximum values of the angles $\alpha 1$ and $\alpha 2$ of the crown inclined elements 5 and the shoulder inclined elements 6 respectively become large, noise performance may be deteriorated since it may be difficult to disturb the air column resonance noise to be generated in each of the main grooves 3 and 4. When the maximum values of the angles $\alpha 1$ and $\alpha 2$ of the crown inclined elements 5 and the shoulder inclined elements 6 become small, wet performance may be deteriorated since the water in each of the main grooves 3 and 4 may not flow smoothly. From the point of view, the maximum value of the angle $\alpha 1$ of each of the crown inclined elements 5 is preferably in a range of from 55 to 70 degrees with respect to the tire axial direction. Further, the maximum value of the angle $\alpha 2$ of each of the shoulder inclined elements 6 is preferably in a range of from 60 to 75 degrees with respect to the tire axial direction.

Preferably, a minimum value of the angle α1 with respect to the tire axial direction of each of the crown inclined elements 5 is greater than a minimum value of the angle α2 of each of the shoulder inclined elements 6 with respect to the tire axial direction. Thus, wet performance may be maintained since relative deterioration of drainage through the crown main groove 3, which may be caused by setting the maximum value of the angle α1 of each of the crown inclined elements 5 being smaller than the maximum value of the angle α2 of each of the shoulder inclined elements 6, is suppressed. Further, noise performance may be maintained since relative deterioration of effect to disturb generating pipe resonance noise in the shoulder main groove, which may be caused by setting the maximum value of the angle α1 of each of the crown inclined elements being smaller than the maximum value of the angle α2 of each of the shoulder inclined elements 6, is suppressed.

Preferably, the minimum value of the angle α1 of each of the crown inclined elements 5 is in a range of from 50 to 65 degrees with respect to the tire axial direction. Preferably, the minimum value of the angle α2 of each of the shoulder inclined elements 6 is in a range of from 35 to 60 degrees with respect to the tire axial direction.

In this embodiment, the difference between the maximum value and the minimum value of the angle α2 of each of the shoulder inclined elements 6 is greater than the difference between the maximum value and the minimum value of the angle α1 of each of the crown inclined elements 5.

Figure 4:
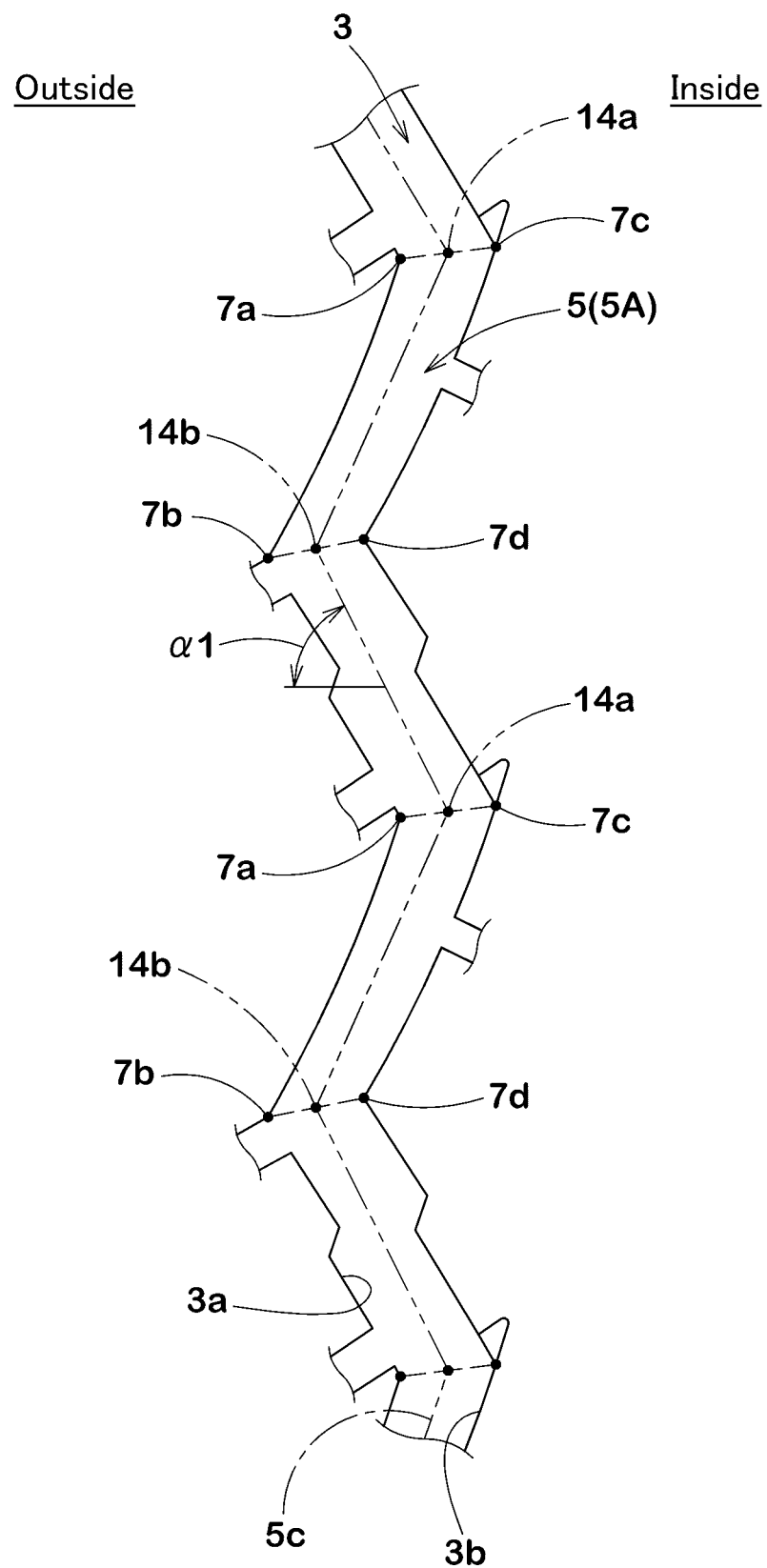
FIG. 4 is an enlarged view of the crown main groove of FIG. 1.

Note that the angles α1 of the crown inclined elements 5 are defined as follows. As illustrated in FIG. 4, the crown main groove 3 includes an axially outer groove edge 3a and an axially inner groove edge 3b. The axially outer groove edge 3a includes first inner peak points 7a located axially innermost thereof and first outer peak points 7b located axially outermost thereof. The axially inner groove edge 3b includes second inner peak points 7c located axially innermost thereof and second outer peak points 7d located axially outermost thereof. The angles α1 of the crown inclined elements 5 mean the angles of the virtual groove center lines 5c of the crown main groove 3 with respect to the tire axial direction wherein the virtual groove center lines 5c is defined as to extend so as to pass alternately the middle points 14a of virtual straight lines connecting the first inner peak points 7a and the second inner peak points 7c and the middle points 14b of virtual straight lines connecting the first outer peak points 7b and the second outer peak points 7d.

Figure 5:
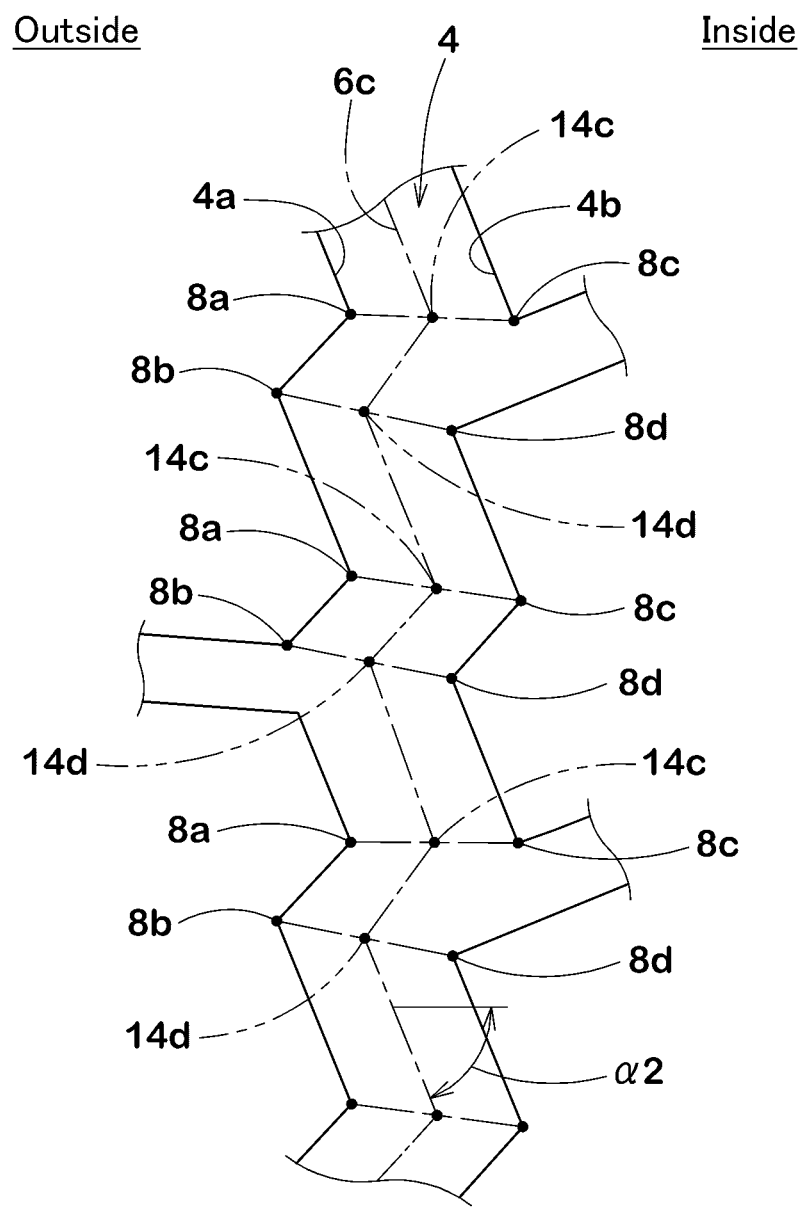
FIG. 5 is an enlarged view of the shoulder main groove of FIG. 1.

Similarly, note that the angles α2 of the shoulder inclined elements 6 are defined as follows. As illustrated in FIG. 5, the shoulder main groove 4 includes an axially outer groove edge 4a and an axially inner groove edge 4b. The axially outer groove edge 4a includes first inner peak points 8a located axially innermost thereof and first outer peak points 8b located axially outermost thereof. The axially inner groove edge 4b includes second inner peak points 8c located axially innermost thereof and second outer peak points 8d located axially outermost thereof. The angles α2 of the shoulder inclined elements 6 mean the angles of the virtual groove center lines 6c of the shoulder main groove 4 with respect to the tire axial direction wherein the virtual groove center lines 6c extends so as to pass alternately the middle points 14c of virtual straight lines connecting the first inner peak points 8a and the second inner peak points 8c and the middle points 14d of virtual straight lines connecting the first outer peak points 8b and the second outer peak points 8d.

As illustrated in FIG. 3, the shoulder main groove 4 may include a continuously and straightly extending void area 4R in the tire circumferential direction between the first inner peak points 8a and the second outer peak points 8d. In the straightly extending void area 4R, the water can flow smoothly. The maximum axial length W of the straightly extending void area 4R, which is an axial length between one of the first inner peak points 8a and one of the second outer peak points 8d of the shoulder main groove 4, is preferably set in a range of from 3% to 5% of the tread width TW in order to further improve drainage performance while maintaining noise performance.

Preferably, the width w2 of the shoulder main groove 4 is greater than the width w1 of the crown main groove 3. Thus, the shoulder main groove 4, which has the number P2 of zigzag pitches greater than that of the crown main groove 3, may also improves in wet performance.

Preferably, the width W1 of the crown main groove 3 is in a range of from 1.5% to 4% of the tread width TW in order to further improve noise performance and wet performance in a good balance. In the same point of view, the width W2 of the shoulder main groove 4 is set in a range of from 5% to 7% of the tread width TW.

Figure 6A:
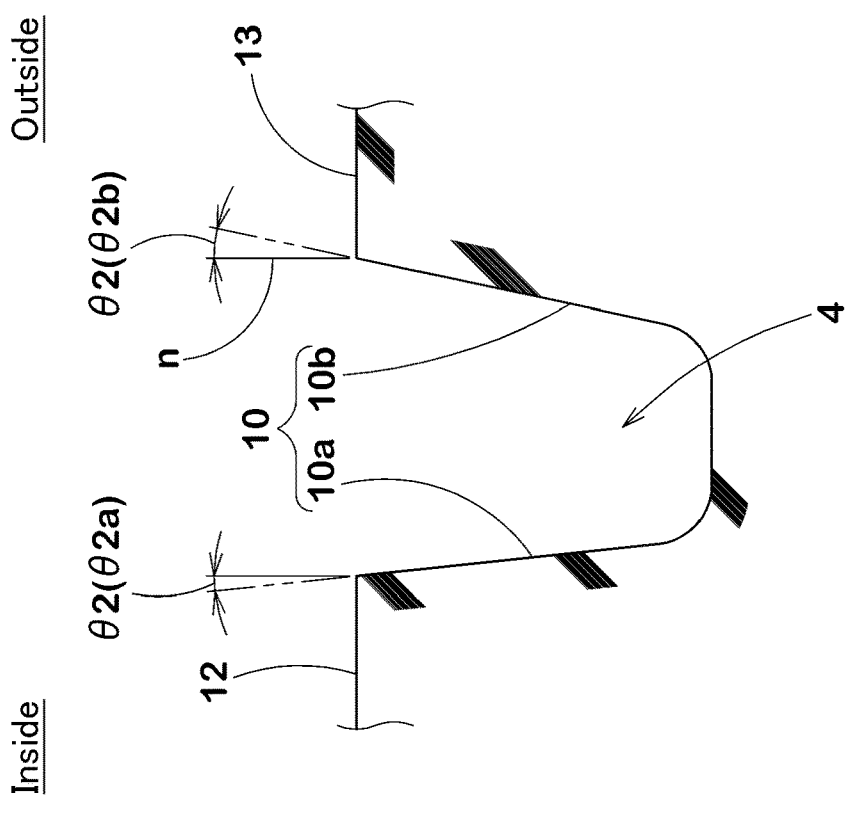
FIGS. 6A and 6B are respectively cross-sectional views taken along lines A-A and B-B of FIG. 1.
Figure 6B:
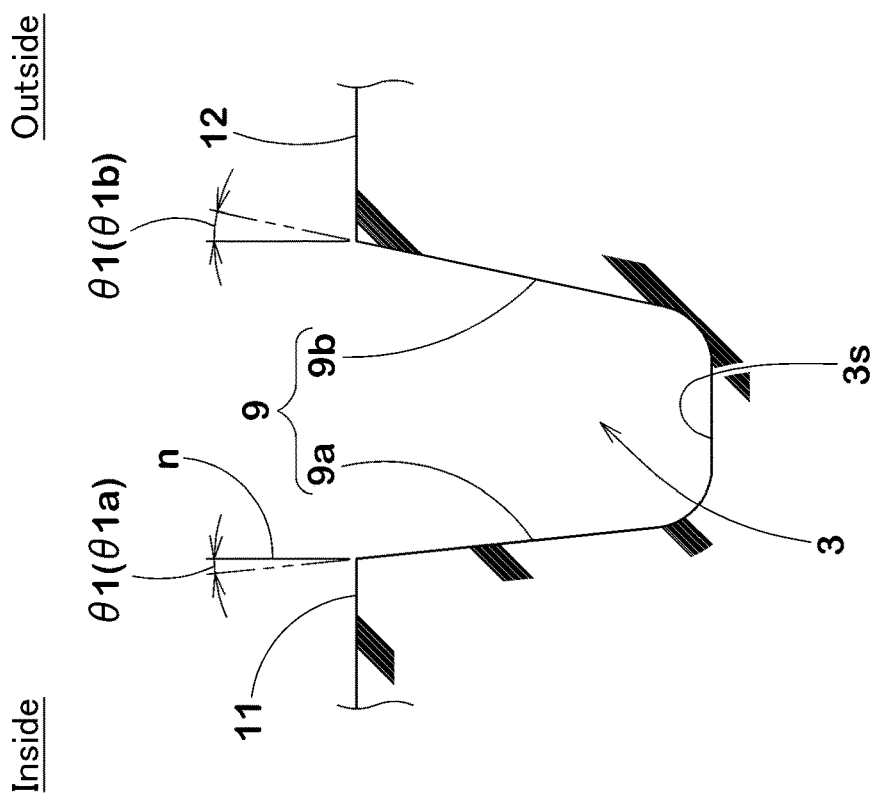

As illustrated in FIGS. 6A and 6B, the crown main groove 3 has a pair of groove walls 9 extending outwardly in the tire radial direction from the groove bottom 3s. Preferably, each of the groove walls 9 is inclined at an angle θ1 of from 4 to 15 degrees with respect to a tread normal line n in order to optimize wet performance and noise performance. In the same point of view, each of the groove walls 10 of the shoulder main groove 4 is preferably inclined at an angle θ2 in a range of from 6 to 15 degrees with respect to a tire normal line n.

In the crown main groove 3, the groove walls 9 include an inner groove wall 9a located inwardly in the tire axial direction with respect to the groove bottom 3s and an outer groove wall 9b located outwardly in the tire axial direction with respect to the groove bottom 3s. In some preferred embodiments, the angle θ1a of the inner groove wall 9a with respect to the tire normal line n may be different from the angle θ1b of the outer groove wall 9b with respect to the tire normal line n. Since the inner groove wall 9a is different in rigidity from the outer groove wall 9b, these groove walls can deform in a different manner when coming into contact with the ground so that pipe resonance noise to be generated in the crown main groove 3 is disturbed. In the same point of view, as to the groove walls 10 of the shoulder main groove 4, the angle θ2a of the inner groove wall 10a with respect to the tire normal line n is preferably different from the angle θ2b of the outer groove wall 10b with respect to the tire normal line n.

Preferably, in the crown main groove 3, the angle θ1a of the inner groove wall 9a is smaller than the angle θ1b of the outer groove wall 9b. Thus, deformation of the outer groove wall 9b which tends to receive large lateral force when cornering, become large, thereby further reducing pipe resonance noise. In order to further improve the above effect, the difference between the angles θ1b−θ1a of the inner groove wall 9a and the outer groove wall 9b of the crown main groove 3 is preferably in a range of from 4 to 8 degrees. In the same point of view, as to the shoulder main groove 4, the difference between the angles θ2b−θ2a of the inner groove wall 10a and the outer groove wall 10b is preferably in a range of from 4 to 8 degrees.

As illustrated in FIG. 1, the tread portion 2 is sectioned into a crown land portion 11, a pair of middle land portions 12 and a pair of shoulder land portions 13 by the pair of crown main grooves 3 and the pair of shoulder main grooves 4.

The crown land portion 11 is provided with a plurality of crown lateral grooves 15 connecting the pair of crown main groove 3 and a plurality of crown lug grooves 16 each extending toward the tire equator C from either one of the crown main grooves 3 and terminating within the crown land portion 11.

In some preferred embodiments, the crown lateral grooves 15 connect the axially adjacent first crown inclined elements 5A. The crown lateral grooves 15 as such may further improve wet performance and may reduce pipe resonance noise by promoting deformation locally on the inner groove wall 9a.

In some preferred embodiments, the crown lateral grooves 15 may be inclined in an opposite direction to the first crown inclined elements 5A to further reduce the pipe resonance noise to be generated in the crown main grooves 3. In order to further improve the above effect, the crown lateral grooves 15 preferably intersect the first crown inclined elements 5A at angles α3 of from 75 to 105 degrees. The angles α3 are measured using the groove centerline of the crown lateral grooves 15 and the virtual groove centerline 5c of the crown main groove.

Preferably, the widths w3 of the crown lateral grooves 15 are in a range of from 30% to 45% of the groove widths w1 of the crown main grooves 3 in order to improve wet performance and noise performance in a good balance, for example.

Figure 7:
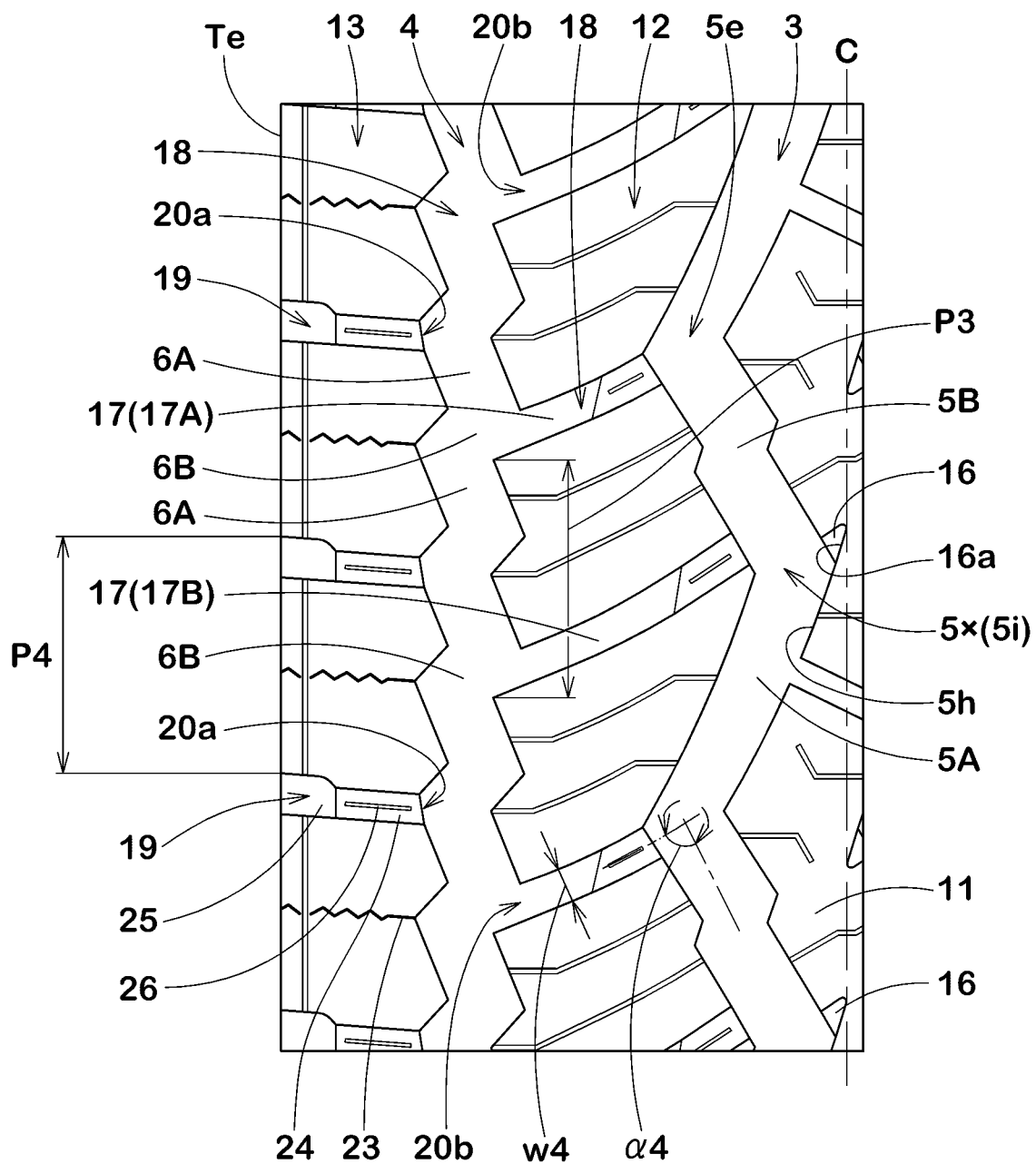
FIG. 7 is an enlarged view of the left side tread portion of FIG. 1.

As illustrated in FIG. 7, the crown lug grooves 16 are provided on corners 5x of the crown land portion 11 where the first crown inclined elements 5A intersect the second crown inclined elements 5B. In some preferred embodiment, the crown lug grooves 16 are provided such that the groove edges 16a of the crown lug grooves 16 are smoothly continued to the groove edges 5h of the first crown inclined elements 5A so as to form a single line, e.g. an arc line in the present embodiment. Thus, the crown lug grooves 16 may disturb standing wave to be generated in the crown main groove 3 effectively to further improve noise performance.

Each of the middle land portions 12 is provided with a plurality of middle lateral grooves 17 each connecting the crown main groove 3 and the shoulder main groove 4 to further improve wet performance.

The middle lateral grooves 17 connect the second crown inclined elements 5B and the second shoulder inclined elements 6B. In this embodiment, since crown lateral grooves 15 are in communication with the first crown inclined elements 5A, and the middle lateral grooves 17 are in communication with the second crown inclined elements 5B, the water on the ground can flow smoothly in the crown main groove 3 as well as the middle main groove 4 in a good balanced manner.

The middle lateral grooves 17 include first portions 17A and second portions 17B. Each of the first portions 17A connects a circumferential first end 5e (an upper end in Figure) of one of the second crown inclined elements 5B and one of the second shoulder inclined elements 6B. Each of the second portions 17B connects a circumferential second end 5i (a lower end in Figure) of one of the second crown inclined elements 5B and one of the second shoulder inclined elements 6B. Since the water under the tread portion 2 can move smoothly between the shoulder main groove 4 and the crown main groove 3 through the middle lateral grooves 17, wet performance of the tire can further be improved. The middle lateral grooves 17 are inclined in an opposite direction to the second crown inclined elements 5B. This makes it possible to further reduce the pipe resonance noise since the middle lateral grooves 17 may disturb standing wave to be generated in the crown main groove 3. In order to further improve the above effect, the middle lateral grooves 17 preferably intersect the second crown inclined elements 5B at angles α4 in a range of from 75 to 105 degrees.

In some preferred embodiment, each of the middle lateral grooves 17 may form a single longer groove 18 by being communicated with the second shoulder inclined elements 6B smoothly. Thus, the water can move between the shoulder main groove 4 and the crown main groove 3 smoothly from each other. In some preferred embodiment as to the single longer groove 18, it is preferable that the axially inner groove edge of the second shoulder inclined elements 6B to which the middle lateral groove 17 is connected may not appear on the ground contact surface of the tread portion 2.

Figure 8:
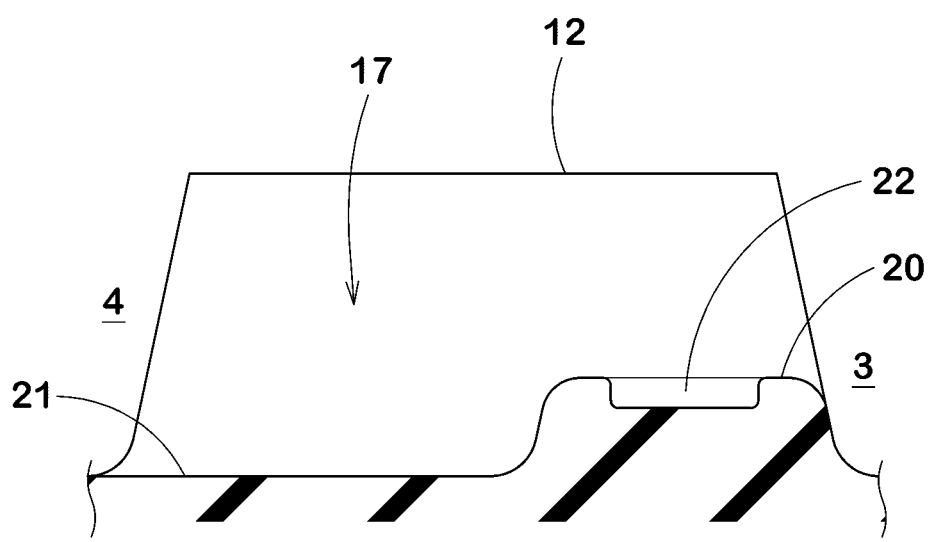
FIG. 8 is a cross-sectional view taken along the line C-C of FIG. 1.

As illustrated in FIG. 8, in some preferred embodiment, each of the middle lateral grooves 17 may include a shallow bottom portion 20 located inwardly in the tire axial direction and a deep bottom portion 21 having a depth deeper than that of the shallow bottom portion 20. Since the middle land portion 12 has different rigidity in either side in the tire axial direction due to the shallow bottom portion 20 and the deep bottom portion 21, different deformations occur on each side of the middle lateral grooves 17 in the tire axial direction when coming into contact with the ground, thereby further improving noise performance.

The shallow bottom portion 20, in this embodiment, is provided with a groove bottom sipe 22. Since the groove bottom sipe 22 as such may open the middle lateral groove 17 widely when the middle land portion 12 comes into contact with the ground, wet performance of the tire can further be improved.

As illustrated in FIG. 7, the widths w4 of the middle lateral grooves 17 are preferably greater than the widths w3 (shown in FIG. 1) of the crown lateral grooves 15. This may drain out the water on the ground under the tread portion effectively from the tire equator C through shoulder lateral grooves 19 which will be described later. In the above point of view, the widths w4 of the middle lateral grooves 17 are preferably in a range of from 110% to 150% of the widths w3 of the crown lateral grooves 15. In addition, the crown lateral grooves 15 having relatively small widths may suppress pipe resonance noise to be generated.

In order to further improve wet performance of the tire, each of the shoulder land portions 13 is provided with shoulder lateral grooves 19 connecting the shoulder main groove 4 and the tread edge Te and shoulder sipes 23 extending from the shoulder main groove 4 toward the tread edge Te.

The shoulder lateral grooves 19 are in communication with the first shoulder inclined elements 6A. As described above, since the middle lateral grooves 17 are in communication with the second shoulder inclined elements 6B, and the shoulder lateral grooves 19 are in communication with the first shoulder inclined elements 6A, wet performance can further be improved. In some preferred embodiment, the shoulder lateral grooves 19 and the middle lateral grooves 17 are arranged alternately in the tire circumferential direction.

In some preferred embodiment, each of the shoulder lateral grooves 19 may include a shallow bottom portion 24 located inwardly in the tire axial direction and a deep bottom portion 25 having a depth deeper than that of the shallow bottom portion 24. Since the shoulder land portion 13 has different rigidity in either side in the tire axial direction due to the shallow bottom portion 24 and the deep bottom portion 25, different deformations occur on each side of the shoulder lateral grooves 19 in the tire axial direction when coming into contact with the ground, thereby further improving noise performance.

The shallow bottom portion 24, in this embodiment, is provided with a groove bottom sipe 26. Since the groove bottom sipe 26 as such may open the shoulder lateral groove 19 widely when the shoulder land portion 13 comes into contact with the ground, wet performance of the tire can further be improved.

As illustrated in FIG. 1, the shoulder sipes 23 may be arranged so as to face the middle lateral grooves 17 in the tire axial direction. In some preferred embodiments, extension lines 23c of the shoulder sipes 23 that the shoulder sipes 23 are extended smoothly inwardly along its longitudinal direction intersect opening ends 17e of the middle lateral grooves 17 on the side of the shoulder main groove 4. The shoulder sipes 23 as such may lower the rigidity of the shoulder land portion 13 locally, and thus the rigidity lowered portions may disturb standing wave to be generated in the shoulder main groove 4 to reduce pipe resonance noise.

The shoulder sipes 23, in this embodiment, are in communication with the first outer peak points 8b of the axially outer groove edge 4a of the shoulder main groove 4, as shown in FIG. 5. Since this aspect may lower the rigidity of the shoulder land portions 13 effectively, standing wave to be generated in the shoulder main groove 4 may further be disturbed.

The shoulder land portions 13 are sectioned into a plurality of shoulder blocks 13B by the shoulder lateral grooves 19. Further, each of the shoulder blocks 13B are divided into a pair of shoulder block pieces 13a and 13b by the shoulder sipe 23.

As illustrated in FIG. 7, each opening end 20a of the shoulder lateral grooves 19 connected to the shoulder main groove 4 is located in different position in the tire circumferential direction to each opening end 20b of the middle lateral grooves 17 connected to the shoulder main groove 4. Thus, superimpose of pitch noise caused by those lateral grooves can be suppressed, thereby further improving noise performance. Preferably, the shoulder lateral grooves 19 which are arranged at circumferential pitches P4 are shifted about a half of each of the arrangement pitches thereof with respect to the middle lateral grooves 18 which are arranged at circumferential pitches P3.

As illustrated in FIG. 1, the crown land portion 11 and the middle land portions 12 are preferably provided with sipes S in order to improve scratch force against the ground as well as wet performance.

While the particularly preferable embodiments in accordance with the present invention have been described in detail, the present invention is not limited to the illustrated embodiments, but can be modified and carried out in various aspects.

EXAMPLES

Pneumatic tires 275/55R20 having the basic tread pattern as illustrated in FIG. 1 were manufactured based on the details shown in Table 1, and then wet performance and noise performance were tested. The common specification are as follows.
Rim: 20×9.0 J
Internal pressure: 250 kPa
Test vehicle: a four-wheel-drive car with a displacement of 3,700 cc
Note that the example and reference tires have the same number P1 of zigzag pitches of the crown main grooves from each other. The test methods are as follows.
Wet Performance Test:
A test driver drove the test vehicle equipped with the test tires on an asphalt test road covered with a 10 mm deep water to evaluate the traveling performance regarding traction and braking properties based on his sense. The test results are shown in Table 1 using a score wherein the Ref. 1 is set to 100. The larger the score, the better the wet performance is.
Noise Performance Test (Vehicle Exterior Noise Test):
The vehicle exterior noise when the above test vehicle was running on a dry asphalt road at 70 km/hr was measured. The test results are shown in Table 1 using an index using a reciprocal of the measurement values wherein the Ref. 1 is set to 100. The larger the score, the better the noise performance is.
Table 1 shows the test results.

TABLE 1

|  | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| Ratio P1/P2 of zigzag pitch numbers | 0.33 | 0.20 | 0.25 | 0.25 | 0.25 | 0.25 | 0.25 | 0.32 | 0.21 |
| Maximum value of angle $\alpha 1$ of crown inclined elements (deg.) | 60 | 60 | 60 | 55 | 70 | 55 | 60 | 60 | 60 |
| Maximum value of angle $\alpha 2$ of shoulder inclined elements (deg.) | 65 | 65 | 65 | 65 | 75 | 60 | 75 | 65 | 65 |
| Maximum axial length W of straightly extending void area of shoulder main groove/tread width TW (%) | 4 | 4 | 4 | 4 | 4 | 4 | 4 | 4 | 4 |
| Groove wall angles $\theta 1a$ of crown main grooves (deg.) | 6 | 6 | 6 | 6 | 6 | 6 | 6 | 6 | 6 |
| Difference between groove wall angles $\theta 1b - \theta 1a$ of crown main grooves (deg.) | 6 | 6 | 6 | 6 | 6 | 6 | 6 | 6 | 6 |
| Noise performance [index: larger is better.] | 100 | 113 | 110 | 111 | 108 | 111 | 106 | 105 | 112 |
| Wet performance [score: larger is better.] | 100 | 90 | 100 | 96 | 101 | 97 | 101 | 100 | 96 |

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Ratio P1/P2 of zigzag pitch numbers | 0.25 | 0.25 | 0.25 | 0.25 | 0.25 | 0.25 | 0.25 | 0.25 |
| Maximum value of angle $\alpha 1$ of crown inclined elements (deg.) | 60 | 60 | 60 | 60 | 60 | 60 | 60 | 60 |
| Maximum value of angle $\alpha 2$ of shoulder inclined elements (deg.) | 65 | 65 | 65 | 65 | 65 | 65 | 65 | 65 |

TABLE 1-continued

|  |  |  |  |  |  |  |  |  |
|---|---|---|---|---|---|---|---|---|
| Maximum axial length W of straightly extending void area of shoulder main groove/tread width TW (%) | 2 | 6 | 4 | 4 | 4 | 4 | 4 | 4 |
| Groove wall angles θ1a of crown main grooves (deg.) | 6 | 6 | 3 | 18 | 6 | 6 | 6 | 6 |
| Difference between groove wall angles θ1b − θ1a of crown main grooves (deg.) | 6 | 6 | 9 | 0 | 3 | 9 | 4 | 8 |
| Noise performance [index: larger is better.] | 112 | 107 | 108 | 111 | 107 | 112 | 110 | 110 |
| Wet performance [score: larger is better.] | 97 | 101 | 101 | 97 | 102 | 97 | 100 | 100 |

As apparent from the test results as shown in Table 1, it was confirmed that the example tires had improved noise performance while ensuring the wet performance as compared with the reference example tires. Further, the same results were shown on the same tests conducted using the different tire sizes to the above tires.

What is claimed is:

1. A tire comprising:
   a tread portion being provided with at least one crown main groove extending continuously in a zigzag manner in a tire circumferential direction and at least one shoulder main groove extending continuously in a zigzag manner in the tire circumferential direction, the at least one shoulder main groove being arranged outwardly of the at least one crown main groove in a tire axial direction; and
   the at least one crown main groove having a number of zigzag pitches in a range of from 0.21 to 0.32 times a number of zigzag pitches of the at least one shoulder main groove,
   wherein:
   the at least one crown main groove comprises a plurality of crown inclined elements each inclined at an angle with respect to the tire axial direction,
   the at least one shoulder main groove comprises a plurality of shoulder inclined elements each inclined at an angle with respect to the tire axial direction,
   a maximum value of the angle of the crown inclined elements is smaller than a maximum value of the angle of the shoulder inclined elements, and
   a minimum value of the angle with respect to the tire axial direction of each of the crown inclined elements is greater than a minimum value of the angle with respect to the tire axial direction of each of the shoulder inclined elements.

2. The tire according to claim 1, wherein
   the maximum value of the angle of the crown inclined elements is in a range of from 55 to 70 degrees with respect to the tire axial direction, and
   the maximum value of the angle of the shoulder inclined elements is in a range of from 60 to 75 degrees with respect to the tire axial direction.

3. The tire according to claim 1, wherein
   the minimum value of the angle of the crown inclined elements is in a range of from 50 to 65 degrees with respect to the tire axial direction, and
   the minimum value of the angle of the shoulder inclined elements is in a range of from 35 to 60 degrees with respect to the tire axial direction.

4. The tire according to claim 1,
   wherein each of the at least one crown main groove and the at least one shoulder main groove has a pair of groove walls inclined at an angle of from 4 to 15 degrees with respect to a tread normal line.

5. The tire according to claim 1,
   wherein the at least one shoulder main groove comprises an axially outer groove edge having a first inner peak portion located axially innermost thereof and an axially inner groove edge having a second outer peak portion located axially outermost thereof, and
   an axial length between the first inner peak portion and the second outer peak portion is in a range of from 3% to 5% of a tread width TW.

6. The tire according to claim 1,
   wherein a width of the at least one shoulder main groove is greater than a width of the crown main groove.

7. The tire according to claim 1, wherein
   the at least one crown main groove comprises a pair of crown main grooves between which a tire equator is disposed,
   each of the pair of crown main grooves has a same zigzag phase from each other in a tire circumferential direction, and
   the at least one shoulder main groove comprises a pair of shoulder main grooves between which the pair of crown main grooves is disposed.

8. The tire according to claim 1, wherein
   the at least one crown main groove comprises a pair of crown main grooves between which a tire equator is disposed,
   the at least one shoulder main groove comprises a pair of shoulder main grooves between which the pair of crown main grooves is disposed,
   the tread portion is sectioned into a crown land portion, a pair of middle land portions, and a pair of shoulder land portions by the pair of crown main grooves and the pair of shoulder main grooves,
   the crown land portion, the pair of middle land portions, and the pair of shoulder land portions are respectively divided into crown blocks, middle blocks and shoulder blocks, and
   circumferential lengths of the crown blocks are greater than those of the middle blocks and the shoulder blocks.

9. A tire comprising:
   a tread portion being provided with at least one crown main groove extending continuously in a zigzag manner in a tire circumferential direction and at least one shoulder main groove extending continuously in a zigzag manner in the tire circumferential direction, the at least one shoulder main groove being arranged outwardly of the at least one crown main groove in a tire axial direction to form a shoulder land portion between the at least one shoulder main groove and a tread edge,
   the at least one crown main groove having a number of zigzag pitches in a range of from 0.21 to 0.32 times a number of zigzag pitches of the at least one shoulder main groove, wherein
   the at least one shoulder main groove comprises an axially outer groove edge having first outer peak points located axially outermost thereof,
   the shoulder land portion is provided with shoulder sipes which are in communication with the respective first outer peak points of the axially outer groove edge of the at least one shoulder main groove, the at least one crown main groove comprises a plurality of crown inclined elements each inclined at an angle with respect to the tire axial direction, the at least one shoulder main groove comprises a plurality of shoulder inclined elements each inclined at an angle with respect to the tire axial direction, and a minimum value of the angle with respect to the tire axial direction of the crown inclined elements is greater than a minimum value of the angle with respect to the tire axial direction of the shoulder inclined elements.

10. The tire according to claim 9, wherein
the shoulder land portion is provided with shoulder lateral grooves each of which is arranged between circumferentially adjacent shoulder sipes, and the shoulder lateral grooves connect the at least one shoulder main groove and the tread edge.

11. The tire according to claim 9, wherein
a maximum value of the angle of the crown inclined elements is smaller than a maximum value of the angle of the shoulder inclined elements.

12. The tire according to claim 9, wherein
the maximum value of the angle of the crown inclined elements is in a range of from 55 to 70 degrees with respect to the tire axial direction, and the maximum value of the angle of the shoulder inclined elements is in a range of from 60 to 75 degrees with respect to the tire axial direction.

13. A tire comprising:
a tread portion being provided with at least one crown main groove extending continuously in a zigzag manner in a tire circumferential direction and at least one shoulder main groove extending continuously in a zigzag manner in the tire circumferential direction, the at least one shoulder main groove being arranged outwardly of the at least one crown main groove in a tire axial direction, the at least one crown main groove having a number of zigzag pitches in a range of from 0.21 to 0.32 times a number of zigzag pitches of the at least one shoulder main groove, wherein the at least one crown main groove comprises first crown inclined elements inclined in a first direction with respect to the tire axial direction and second crown inclined elements inclined in a second direction opposite to the first direction with respect to the tire axial direction, each of the zigzag pitches of the at least one crown main groove is a respective pair of one of the first crown inclined elements and one of the second crown inclined elements which are arranged adjacently in a tire circumferential direction, each second crown inclined element comprises a pair of inclined portions each inclined in the second direction with respect to the tire axial direction and a small inclined portion arranged between the pair of inclined portions with a smaller circumferential length than lengths of the inclined portions and being inclined in the first direction with respect to the tire axial direction, the at least one shoulder main groove comprises a plurality of shoulder inclined elements each inclined at an angle with respect to the tire axial direction, and a minimum value of an angle with respect to the tire axial direction of the first and second crown inclined elements is greater than a minimum value of the angle with respect to the tire axial direction of the shoulder inclined elements.

14. The tire according to claim 13, wherein
the at least one crown main groove comprises a pair of crown main grooves between which a tire equator is disposed, the at least one shoulder main groove comprises a pair of shoulder main grooves between which the pair of crown main grooves is disposed, the tread portion is sectioned into a crown land portion, a pair of middle land portions, and a pair of shoulder land portions by the pair of crown main grooves and the pair of shoulder main grooves, the pair of middle land portions is provided with middle lateral grooves, and the middle lateral grooves are connected to the respective second crown inclined elements of the one of the pair of crown main grooves.

15. The tire according to claim 14, wherein
the middle lateral grooves comprise first portions and second portions, each of the first portions is connected to a circumferential first end of a respective one of the second crown inclined elements, and each of the second portions is connected to a circumferential second end of a respective one of the second crown inclined elements.

16. The tire according to claim 13, wherein
a maximum value of the angle of the first and second crown inclined elements is smaller than a maximum value of the angle of the shoulder inclined elements.

17. The tire according to claim 13, wherein
the maximum value of the angle of the first and second crown inclined elements is in a range of from 55 to 70 degrees with respect to the tire axial direction, and the maximum value of the angle of the shoulder inclined elements is in a range of from 60 to 75 degrees with respect to the tire axial direction.

* * * * *